United States Patent [19]

Barker et al.

[11] Patent Number: 4,589,628
[45] Date of Patent: May 20, 1986

[54] UNITARY BEARING AND LOCATOR ASSEMBLY FOR ROTATABLE VALVES

[75]. Inventors: James E. Barker, Sauk Rapids; James C. Hadley, Sartell, both of Minn.

[73] Assignee: General Signal Corporation, Stamford, Conn.

[21] Appl. No.: 620,436

[22] Filed: Jun. 14, 1984

Related U.S. Application Data

[63] Continuation-in-part of Ser. No. 416,505, Sep. 10, 1982, abandoned.

[51] Int. Cl.[4] ............................................. F16K 31/44
[52] U.S. Cl. ..................................... 251/214; 251/308
[58] Field of Search ............... 251/305, 307, 308, 214, 251/306

[56] References Cited

U.S. PATENT DOCUMENTS

| | | | |
|---|---|---|---|
| 693,247 | 2/1902 | Edwards | 301/112 |
| 734,171 | 7/1903 | Hamilton | 384/275 |
| 1,220,991 | 3/1917 | McGinley | 384/295 |
| 1,333,617 | 3/1920 | Harkins | 251/304 X |
| 1,517,335 | 12/1924 | Zinis | 251/305 X |
| 1,859,608 | 5/1932 | Vigne | 384/296 |
| 2,821,444 | 1/1958 | Brown | 384/432 |
| 2,876,984 | 3/1959 | Reppert | 251/175 |
| 3,269,785 | 8/1966 | LeFevre | 384/129 |
| 3,277,919 | 10/1966 | Piccardo | 137/315 |
| 3,498,583 | 3/1970 | Friedell | 251/308 |
| 3,575,381 | 4/1971 | Gilmore | 251/368 |
| 3,795,428 | 3/1974 | Paine et al. | 384/286 |
| 3,938,541 | 2/1976 | Polacheck et al. | 137/239 |
| 4,057,217 | 11/1977 | MacDonald | 251/308 |
| 4,134,175 | 1/1979 | Contoyanis | 16/2 |
| 4,270,730 | 6/1981 | Hinrichs | 251/308 |

Primary Examiner—James C. Yeung
Attorney, Agent, or Firm—Barnes & Thornburg

[57] ABSTRACT

A unitary bearing and locator assembly is provided having a body portion with a passageway therethrough and an integral shoulder flange portion. In one embodiment, this shoulder flange includes a rectilinear perimeter and a radiussed surface. In another embodiment, the shoulder flange has a generally curved perimeter with only a portion thereof being flattened. The bearing is adapted to be inserted in a valve assembly between a rotatable shaft, on which a valving member is mounted, and a shaft bore in the valve body. The shoulder flange is adopted to support and distribute the load from this valving member within the valve body and the fluid passageway therethrough. The linear portions shoulder flange perimeter are adapted to engage portions of the valve body and prevent rotation of the unitary bearing and locator with respect to the valve body. The radiussed surface of the shoulder flange is adapted to engage portions of said valve body to prevent bearing rotation, provide positive location, and improve load distribution and carrying capabilities.

6 Claims, 10 Drawing Figures

UNITARY BEARING AND LOCATOR ASSEMBLY FOR ROTATABLE VALVES

BACKGROUND OF THE INVENTION

The present application is a continuation-in-part of Ser. No. 416,505 filed Sept. 10, 1982, now abandoned.

The present invention relates generally to bearings for valves having rotatable valving members and, more specifically, to bearings in butterfly or ball-type valve assemblies which are suitable for providing reliable service at high fluid temperatures and/or for corrosive fluids.

Butterfly valve assemblies are known to require sleeve bearings, about the rotatable shaft passing through the valve body and on which the valving disc or member is mounted, as well as thrust bearings supporting the valving member, and centering or locating means to maintain the valving member in proper alignment within the fluid passageway so as to permit said valving member to properly open and close and form a tight seal.

In prior butterfly valve art, each of these bearings and locator requirements was met by means of separate and distinct elements. In order to prevent contact surface galling and provide the necessary structural characteristics for each specific requirement, each such bearing or locator was typically formed from different materials. For example, Teflon has been used for sleeve bearings, graphite-coated steel for thrust bearings, and various metal alloys or yieldable materials for locators. On occasion, even woven materials have been used as anti-friction surfaces. Bearing and locator materials have had to be selected carefully for compatability with each other as well as with the fluid environment. Also, each part has had to be machined or formed to within very exacting tolerances to be properly fitted within the restricted confines of the valve body. When multiple machined parts are stacked up in typical butterfly valve bearing/locator arrangements, excess dimensions over machining tolerances add up and may present a significant dimensional variation.

In prior art butterfly valves it has often been necessary to press fit the sleeve bearing into the appropriate shaft bore or counter-bore the shaft bore in order to prevent the sleeve bearing from sliding longitudinally along the shaft or rotating within the shaft bore. Such longitudinal motion is undesirable since it would destroy the valve and bearing alignment necessary for the valving member to function properly. Such rotational motion is undesirable since it would increase wear on the outside diameter of the bearing element against the valve body and ultimately result in galling or leakage. Unfortunately, press fitting involves inherently some loss of dimensional control over the bearing as the bearing is compressed to fit a smaller shaft bore. Counter-boring the valve body and/or the valving member and enlarging the shaft bore in that region to be fitted with the sleeve bearing is an expensive and time consuming process. Because of the severe space limitations peculiar to interior butterfly valves, other methods of preventing bearing movement were unavailable or too expensive.

For similar reasons, thrust bearings also commonly have had to be fitted by counter-boring the valving member and/or valve body so as to provide a secure bearing seat. Further, without counter-boring, thrust bearings and valve disk locators provide no radial support for the shaft or the valve disk. If these elements do not provide such radial support, the sleeve bearing and shaft length must be increased so that adequate support is available. Also, the space limitations within butterfly valves also restrict the load distribution and support capabilities of valve disk locators.

Proper centering and locating of the sleeve and thrust bearings as well as the valve disk locators in the valve body have been additional concerns of the prior art. Without careful placement and centering, the valve disk will not properly close and leakage will result. To prevent such leakage, very precise machining and/or counter-boring has been needed. Split-ring bearings have been employed in some applications, but in corrosive environments they are typically adversely affected by corrosion of the adjacent housing surfaces, causing them to close in on the shaft and seize up.

When self-lubricating materials such as Teflon could be employed to form a bearing element, some leeway was gained against the build-up of excess machining tolerances since additional space-filling contact surface lubricants were not necessary. In addition, bearing elements of Teflon and other resilient or yieldable materials were sufficiently compressible that such bearing elements could be made slightly oversized and then pressed together in a stack to produce the desirable tight fit. However, such multi-piece bearing and locator stacks have suffered from excessive material wear at their junctive surfaces, and greater surface area is exposed to corrosion. Also, bearing elements formed from Teflon and other yieldable materials were not available for use in high temperature and corrosive fluid environments.

Excessive wear requires frequent in-field replacement of the bearings, and for sleeve bearings this has often been especially difficult. Press fit sleeve bearings require special tools to remove and replace them. Counter-boring makes field replacement of worn out bearings easier and permits greater retention of dimensional control as compared with press fitting. However, counter-boring of valve bodies and/or valve members causes a substantial degree of machining tolerance control to be lost and, thus, radial alignment and positive locating of the valving member is adversely affected. In addition, replacement bearings fitted by counter-boring must again be rotation-locked within the shaft bore and, due to the space constraints imposed by industry and trade association standards unique to butterfly valve assemblies, obtaining a reliable in-field rotation-lock can be especially difficult. At the same time, this rotation-lock must not interfere with the valving member sealing means nor restrict rotation of that member within the fluid passageway.

When butterfly valves are employed in conjunction with fluids having high temperatures (such as 1000° F.) or being extremely corrosive or in firesafe valve applications, additional problems and concerns arise. To counterbalance the high costs of machining and assembly, inexpensive materials, with a narrow, low range of temperatures, have been typically employed in prior butterfly valves. Teflon and most other self-lubricating materials decompose or break down in high temperature and corrosive environments and, thus, cannot be used for such valves. The enlarged fluid-exposed surface area of stacked multi-piece bearings becomes critical in corrosive fluid passages and useful bearing life may be sharply diminished. Metal alloys capable of withstanding high temperatures and corrosive fluids and yet performing effectively as non-galling bearings are often very expensive and, hence, machining of bearing and locator elements must be kept to a minumum so as to decrease production costs. Also, fluid system down time must especially be reduced for systems involving such dangerous fluids. Thus, even high temperature bearings must be constructed so as to be readily replaceable in the field. In general, multi-piece bearing units employed in high temperature or corrosive fluid environment have proved to be too expensive and/or ineffective at solving the above detailed problems.

SUMMARY OF THE INVENTION

An object of the present invention is the provision of an improved bearing means for a valve having a rotatable valving member therein.

Another object is to provide a unitary sleeve bearing, thrust bearing, and valving member locator means for a butterfly valve assembly.

A further object of the invention is to provide a unitary bearing means suitable for replacing plural, separate bearing means in butterfly valve assemblies that is relatively inexpensive.

Yet another object is to provide a unitary, metallic bearing means suitable for use in butterfly valve assemblies controlling the passage of high temperature or corrosive fluids therethrough and to provide a rotation-locked shaft sleeve bearing, valving disk thrust bearing, and valving member or disk locator means all within the single bearing means unit.

Still another object is the provision of a valve bearing and locator arrangement requiring minimal machining.

Still further another object is to provide a valve bearing and locator arrangement having improved anti-rotation and positive location characteristics and increased load distribution and support capability.

Still yet another object is the provision of an improved, field replaceable valve bearing and locator arrangement employing a minimum of material and wear surfaces.

These and other objects of the present invention are attained by providing a unitary bearing and locator assembly having a body portion with a passageway therethrough and an integral shoulder flange portion. In one embodiment, this shoulder flange includes a rectilinear perimeter and a radiussed or curved surface. In another embodiment, the shoulder flange has a generally curved perimeter with only a portion thereof being flattened. The bearing is adapted to be inserted in a valve assembly between a rotatable shaft, on which a valving member is mounted, and a shaft bore in the valve body. The shoulder flange is adapted to support and distribute the load from this valving member within the valve body and the fluid passageway therethrough. The linear portions of the shoulder flange perimeter are adapted to engage portions of the valve body and prevent rotation of the unitary bearing and locator with respect to the valve body. The lower radiussed surface of the shoulder flange is adapted to engage radiussed portions of said valve body to prevent bearing rotation, provide positive location, and improve load distribution and carrying capabilities.

Other objects, advantages and novel features of the present invention will become apparent from the following detailed description of the invention when considered in conjunction with the accompanying drawings.

DESCRIPTION OF THE PREFERRED EMBODIMENTS

Figure 1:
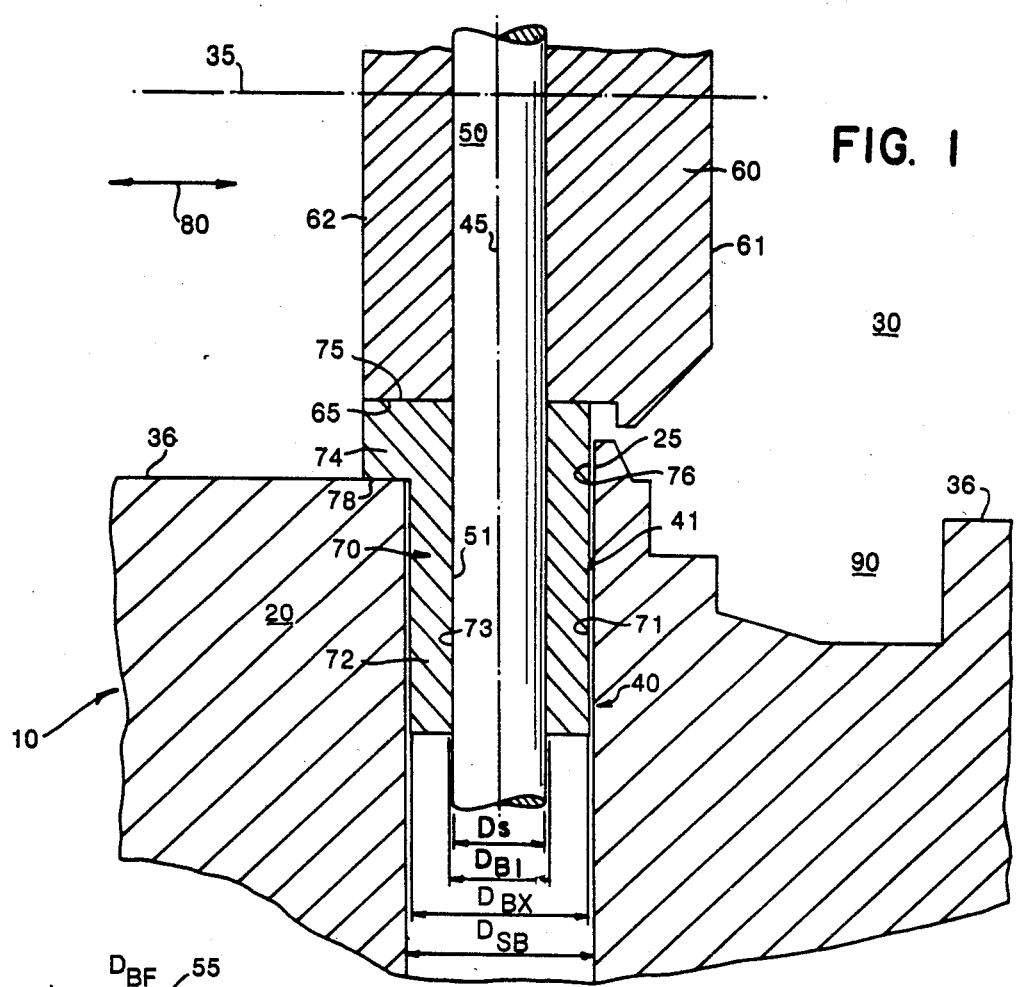
FIG. 1 shows a partial cross-sectional view of a butterfly valve incorporating a unitary bearing means according to the teachings of the present invention.
Figure 2:
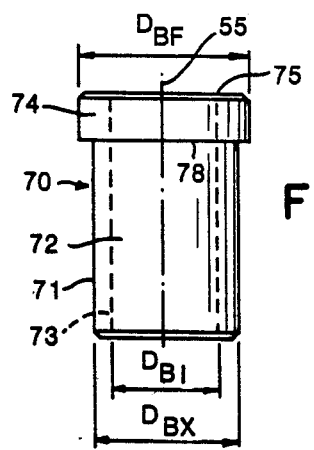
FIG. 2 shows a side view of the unitary bearing means of FIG. 1 out of the butterfly valve structure of FIG. 1.
Figure 3:
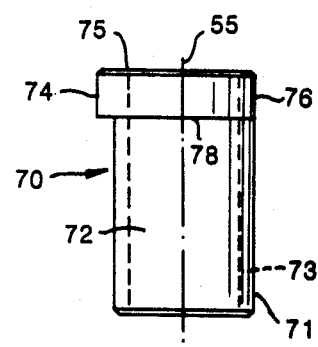
FIG. 3 shows another side of the unitary bearing means of FIG. 1.

The subject matter of the present invention includes unitary bearing and locators 70 and 170, as adapted to be mounted within valve body 20 of butterfly valve 10. Unitary bearing and locator 70 of FIGS. 1-4 represents an embodiment of the present invention having a shoulder flange perimeter with only a portion 76 thereof being linear or flattened and the shoulder flange surfaces 75 and 78 being generally flat. Unitary bearing and locator 170 of FIGS. 5-10 represents an embodiment of the present invention having a rectilinear shoulder flange perimeter 176 and radiussed shoulder flange surfaces 178.

FIG. 1, which illustrates a preferred embodiment of the unitary bearing and locator of the present invention as incorporated in a butterfly valve assembly, shows a butterfly valve 10 having a valve body member 20 with a fluid passageway 30 therein which permits fluid flow therethrough. Although not shown in FIG. 1, the present invention specifically contemplates use in valves wherein valve body 20 is assembled from plural elements, as such an arrangement is not essential to the present invention. Fluid passageway 30 has a central longitudinal axis 35 and an interior surface 36 within the valve body 20. Also within valve body 20 are plural shaft bores 40, of which only one is shown in FIG. 1. Each such shaft bore 40 has an interior surface 41 and a central longitudinal axis 45 and extends from fluid passageway interior surface 36 into valve body 20. In FIG. 1, shaft bore 40 is shown as extending from surface 36 in a radially outward direction such that shaft bore central longitudinal axis 45 traverses central longitudinal axis 35 of fluid passageway 30, although such an orthogonally aligned arrangement is again not an essential feature of the present invention.

A rotatable shaft 50 has a peripheral surface 51 about its exterior circumference and a central longitudinal axis, shown coincident with central longitudinal axis 45 in FIG. 1. It is to be clearly understood that such an arrangement is not an essential feature of the present invention. Shaft 50 is positioned within valve 10 such that at least a portion thereof is inserted into each shaft bore 40. Although FIG. 1 only shows shaft 50 inserted into a single shaft bore 40, it is to be clearly understood that FIG. 1 shows only a portion of the cross-section of a butterfly valve. Accordingly, there is typically at least one other portion of shaft 50 inserted into at least one other shaft bore 40 within valve body 20 of valve 10 in that area above fluid passageway central longitudinal axis 35 which is not shown in FIG. 1. Valving member 60, shown in FIG. 1 to be a butterfly valve disc, is fixedly mounted on shaft 50 within fluid passageway 30. Shaft 50 is rotatable within passageway 30 and shaft bore 40. Thus, valving member 60 is rotatable within fluid passageway 30 to various positions which provide for passage, restriction, or prevention of fluid flow through valve 10.

This control of fluid flow is generally provided by the arrangement of fluid engaging surfaces 61 and 62 of valving member 60 with respect to the primary directions of fluid flow through passageway 30, as indicated by arrows 80. In the preferred embodiment of the present invention, valving member 60 is a disk and, hence, fluid engaging surfaces 61 and 62 are generally circular. When the surface planes of said circular fluid engaging surfaces 61 and 62 are generally parallel to the primary direction of fluid flow 80, i.e., when valving member 60 is open, fluid flow is freely permitted through fluid passageway 30. As valving member 60 is closed, the angle between the surface plane of said circular fluid engaging surfaces increases and, thus, fluid flow is restricted through fluid passageway 30. When valving member 60 is closed as shown in FIG. 1, the surface plane of said circular fluid engaging surfaces 61 and 62 is approximately perpendicular to primary direction of fluid flow 80 and, thus, no flow is permitted through fluid passageway 30 in valve 10. Although the subject invention contemplates the use of a valving member 50 in whose closed position fluid engaging surfaces 61 and 62 do not have surface planes perpendicular to the direction of fluid flow, such a valve structure has not been found, for most applications, to be as advantageous as the valve structure described herein above.

Although also not shown in FIG. 1, means are provided on valve 10 for controlling the rotation of shaft 50 and valving member 60 within fluid passageway 30. Various fluid flow control devices are well-known in the prior art and, hence, it is not necessary to discuss them in detail in this specification.

Unitary bearing and locator 70 is provided for each shaft bore 40 into which a portion of shaft 50 is inserted. This bearing and locator 70 has at least a portion 72 thereof mounted inside shaft bore 40 between interior surface 41 of shaft bore 40 and peripheral surface 51 of shaft 50. Thus, unitary bearing and locator 70 provides a sleeve bearing means for shaft 50. Lower surface 78 of shoulder flange 74 engages valve body 20 and provides load support for valving member 60. Also, upper surface 75 of shoulder flange 74 engages surface 65 of valving means 60 so as to provide a thrust bearing means for valving means 60. When plural unitary bearings and locators 70 are employed each in separate valve bores 40, upper surfaces 75 of each bearing 70 act in conjunction with each other so as to provide a centering or locating for valving member 60.

Unitary bearing and locator 70 is comprised generally of a hollow body portion 72 and a shoulder flange 74 having a flattened peripheral portion 76 thereon. Hollow body portion 72 has interior and exterior surfaces 73 and 71, respectively, thereon such that exterior surface 71 engages interior surface 41 of shaft bore 40 when bearing and locator 70 is inserted within shaft bore 40, and interior surface 73 engages peripheral surface 51 of shaft 50 when shaft 50 is inserted within bearing and locator 70.

It has been found to be particularly advantageous to minimizing machining, although not essential to the subject invention, to form shaft 50, bearing and locator 70, and shaft bore 40 so that each has a cylindrical cross-section and so that each of their central longitudinal axis coincide, as shown in FIG. 1. In order to permit bearing and locator 70 to be fitted within shaft bore 40 without having to press fit or otherwise forceably insert bearing and locator 70 into shaft bore 40 in a manner which will result in the deformation bearing and locator 70, the diameter of exterior surface 71 should be less than or equal to the diameter of interior surface 41. In order to permit rotation of shaft 50 within bearing and locator 70, the diameter of interior surface 73 should be greater than the diameter of peripheral surface 51. Stated with reference to FIGS. 1 and 2, $D_{SB}$ should be greater than or equal to $D_{BX}$, and $D_{BI}$ should be greater than $D_S$. In order to prevent galling between interior surface 73 and peripheral surface 51, it may be appropriate in some applications to employ lubricants in the space between these two surfaces.

Shoulder flange 74 is formed integrally with hollow body portion 72 of bearing and locator 70. Shoulder flange 74 is positioned within valve body 20 and fluid passageway 30 and is provided with sufficient thickness or height so that upper surface 75 of bearing and locator 70 may engage surfaces 65 of valving member 60 to function as a thrust bearing and locator for valving member 60 and yet not cause significant degradation of the fluid seal around valving member 60. Although not shown in FIG. 1, it is to be clearly understood that the subject invention contemplates the use of various sealing rings or other sealing means positioned in recess 90 for valving member 60 in conjunction with bearing and locator 70. It has been found to be particularly advantageous although not essential to the subject invention, to form shoulder flange 74 as an annular lip extending completely about the exterior surface of hollow body portion 72. The outermost exterior diameter $D_{BF}$ across shoulder flange 74 is greater than either diameter $D_{BX}$ of exterior surace 71 or diameter $D_{SB}$ of interior surface 41, thus, shoulder flange 74 does not fit entirely within shaft bore 40 and may rest on interior surface 36 of fluid passageway 30 between surfaces 36 and 65 so as to retain bearing and locator 70 within shaft bore 40 such that motion along axis 45 is prohibited.

Figure 4:
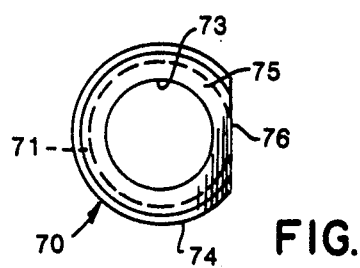
FIG. 4 shows a top view of the unitary bearing means of FIG. 1.
Figure 5:
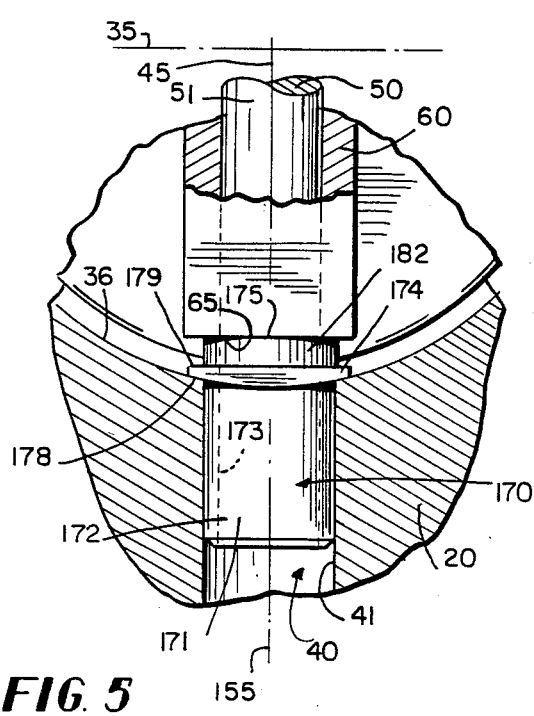
FIG. 5 shows a partial cross-sectional view of a butterfly valve incorporating another embodiment of the unitary bearing means according to the teachings of the present invention.
Figure 6:
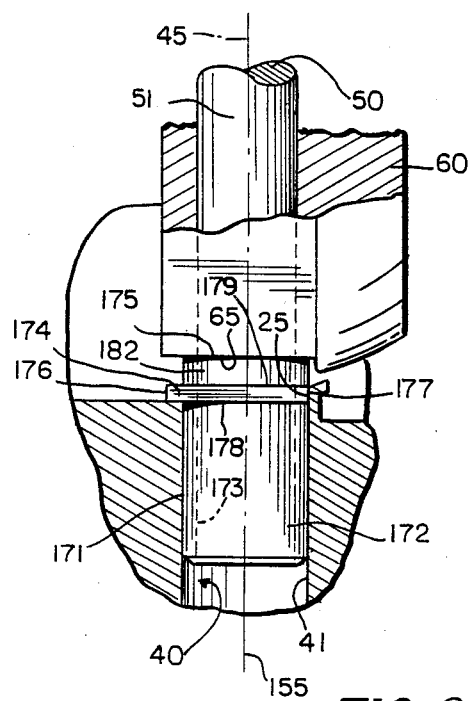
FIG. 6 shows a partial cross-sectional view of the butterfly valve and unitary bearing means of FIG. 5 from a perspective generally orthogonal to that of FIG. 5.

Shoulder flange 74 is provided with a flattened portion 76 on its outermost perimeter which serves to prevent rotation of bearing and locator 70 within shaft bore 40. If shoulder flange 74 is advantageously chosen to be an annular lip extending from hollow body portion 72, then flattened portion 76 forms a secantial cut across said annular lip as shown in FIG. 4. To provide a most effective locking means against rotation of bearing and locator 70, flattened portion 76 may interlockingly engage a correspondingly flattened portion 25 extending from valve body 20. As shown in FIG. 1, corresponding flattened portion 25 does not need to take up much room in the valve body and may form a wall for defining sealing ring recess 90.

Unitary bearing and locator 70 may be advantageously formed from a single, homogeneous material, such as stainless steel or nickel alloys, which is capable of operation at normal fluid temperatures as well as high temperatures, such as 1000° F., and with fluids which have a high corrosive nature.

Since bearing and locator 70 is a unitary element, fewer surface areas are exposed to corrosion and wear, machining tolerance build-up is reduced, bearing production costs are reduced, and interbearing motion is eliminated without the need to press fit or counterbore. Also, assembly and replacement costs and time are reduced since the provision of an integral shoulder and rotation-lock means thereon eliminates the need for press-fitting and counterboring. Likewise, greater dimensional control is retained and the likelihood of contact surface galling is reduced. Finally, unlike multi-piece stacks of bearings in the prior art, the unitary bearing and locator provides an efficient rotation-lock means for use with butterfly valves having very strict space limitations within the fluid passageway.

As shown in FIGS. 5-10, another embodiment of the unitary bearing arrangement of the present invention provides further advantages and novel features over the prior art. Unitary bearing and locator 170 may be mounted similarly to unitary bearing and locator 70 in valve body 20. Unitary bearing and locator 170 includes hollow-body portion 172 which is mountable in shaft bore 40 of valve body 20 so as to receive shaft 50 of valving member 60. Unitary bearing and locator 170 also serves sleeve and thrust bearing and valve member locator functions.

Shoulder flange 174 is integrally formed on hollow body portion 172. Shoulder flange 174 includes a generally rectilinear perimeter 176 (shown to be rectangular in FIGS. 5-10). Hollow body portion 172 has interior and exterior surfaces 173 and 171, respectively, thereon such that exterior surface 171 is engagable with interior surface 41 of shaft bore 40 when bearing and locator means 170 is insertable into shaft bore 40. Further, interior surface 173 is engagable with peripheral surface 51 of shaft 50 when shaft 50 is insertable into bearing and locator menas 170. Thus bearing and locator 170 functions as a sleeve bearing for shaft 50. The advantages of the specific material compositions and dimensional relations and orientations of the bearing and locator with respect to the shaft and shaft bore as described above with unitary bearing and locator 70 also apply with regard to unitary bearing and locator 170.

Shoulder flange 174 includes lower surface 178 and upper surface 179. Unitary bearing and locator 170 further includes a neck portion 182 extending a specific thickness or height above shoulder flange 174 such that upper rim 175 is engageble with surface 65 of valving member 60 when the bearing and locator is positioned within valve body 20. At the same time, lower surface 178 of shoulder flange 174 is engagable with interior surface 36 of valve body 20. Thus, extending neck portion 182 and shoulder flange 174 function as a thrust bearing for valving member 60. Likewise, in combination, a plurality of such extending portions and shoulder flanges on opposing bearings and locators 170 each in separate valves bores 40 serves to locate and properly center valving member 60 within valve body 20 as well as prevent longitudinal motion of the bearing and locator elements along the shaft.

In general, shoulder flange 174 projects radially outward, with respect to longitudinal axis 155, further from bearing and locator 170 than does shoulder flange 74 from bearing and locator 70. Rectilinear perimeter 176 is engageable by corresponding flattened portions 25 of valve body 20 to prevent rotation of bearing and locator means 170. By providing a larger perimeter and linear portions 176 over the entire perimeter of shoulder flange 172, unitary bearing and locator 170 provides increased anti-rotational characteristics over unitary bearing and locator 70. This results not only because of the increased "flat" or surface area mating with flattened portions 25, but also because mating flattened portions 25 may thus be formed at various different and additional locations according to the desired characteristics of any particular valve body.

Figure 7:
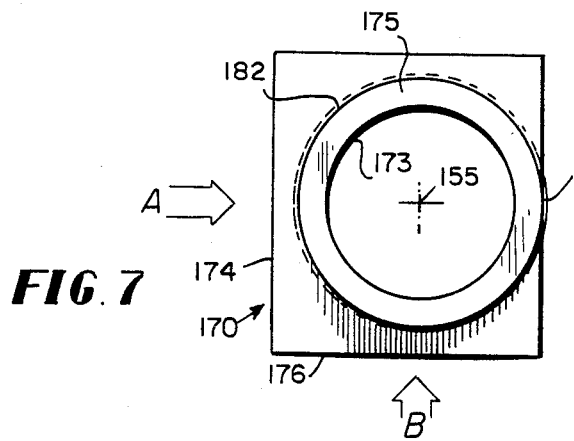
FIG. 7 shows a top view of the unitary bearing means of FIG. 5 out of the butterfly valve structure of FIG. 5.
Figures 8, 9, 10:
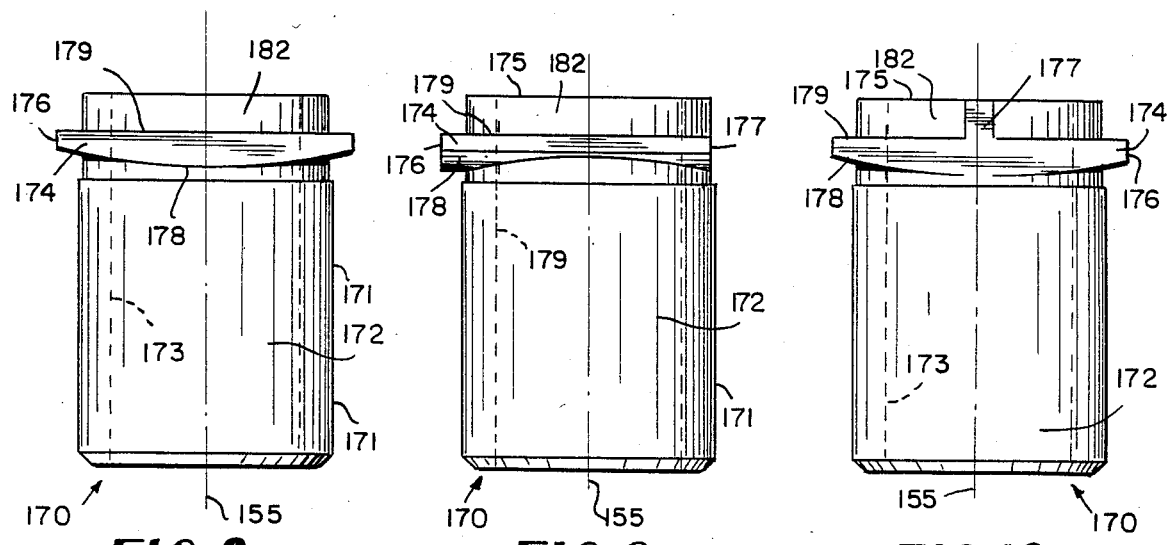
FIG. 8 shows a view from Side A of the unitary bearing means of FIG. 7.
FIG. 9 shows a view from Side B of the unitary bearing means of FIG. 7.
FIG. 10 shows a view from Side C of the unitary bearing means of FIG. 7.

Further, the center of rectilinear perimeter configuration of shoulder flange 174 is radially offset with respect to longitudinal axis 155 hollow body portion 172, as shown in FIGS. 7 and 9. This results in a keying of bearing and locator 170 to a particular orientation with respect to the valve body. In particular, note that shoulder flange 174 is not present at flat portion 177. Such keying may also result from a unique rectilinear perimeter configuration itself. Keying unitary bearing and locator 170 improves the ease of in-field assembly.

Lower surface 178 is radiussed or curved surface, as compared with generally flat lower surface 78 of bearing and locator means 70. As shown cross-sectionally in FIG. 5, lower surface 178 forms a shallow concavity with respect to upper surface 179. This curve of lower surface 178 is coincident with the curve of inner surface 36 with respect to central longitudinal axis 35 (shown in FIG. 1 only). Interior surface 36 thus forms a mating surface when engagable with lower surface 178. This radiussed lower surface configuration of shoulder flange 174 provides several advantages, including positive bearing location and alignment within the valve body (and subsequent positive location of the valving member) by surface mating or keying of surfaces 178 and 36. This mating surface arrangement also prevents rotation of bearing and locator 170 and improves the load distribution and carrying ability of shoulder flange 174 with respect to the stresses and loads applied by valve member 60 and shaft 50.

With respect to prior valve bearing and locator arrangements, the present invention requires considerably less machining, thus reducing initial assembly costs. Further, since a unitary element is employed, shaft support is provided over the entire bearing and locator element length. Compared to multipiece arrangements, tests have shown the present invention to permit a 21% reduction in sleeve bearing length and a 5% reduction in shaft length. Since machining costs and material needs are lower, more expensive materials may be employed, having a greater useful temperature range, at competitive costs. For example, the present invention may be produced by stainless steel investment cast as a unitary element and machined only to form the inside and outside diameters of the sleeve bearing portion (surfaces 173 and 171, respectively).

Thus, the configuration of shoulder flange 174 with respect to hollow body portion 172 and valve body 20 provides improved anti-rotation characteristics from two independent means as well as wear-reducing positive location within the valve body. Preventing rotation between bearing and locator 170 and valve body 20 results in reduction in wear therebetween and improves the operating efficiency and useful lifetime of these elements. Positive location improves valve disk centering in butterfly valves and reduces excess machining tolerance stack-up problems. Finally, by providing a unitary, keyed element, both initial and field assembly is significantly simplified; one part is inserted or replaced, rather than three, and press-fitting and counter-boring are unnecessary. Inventory costs may be greatly reduced since the same unitary bearing and locator element of the present invention may be employed in a wider range of temperature and fluid composition environments.

From the preceding description of the preferred embodiments, it is evident that the objects of the present invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. In a valve means, suitable for use with high temperature and pressure fluids, including a valve body having a fluid passageway therethrough, at least one shaft bore extending into said valve body, a valving member disposed within said fluid passageway and rotatably mounted on a shaft supported within said shaft bore, sleeve bearing means between said shaft and said shaft bore, thrust bearing means for supporting said shaft and said valving member and locating means for positioning and aligning said valving member within said fluid passageway, the improvement being a unitary sleeve and thrust bearing and locating means comprising:
    a hollow body portion inserted within said shaft bore and having said inserted therethrough so as to provide a sleeve bearing means for said shaft upon rotation of said shaft;
    a shoulder flange portion integrally formed with said hollow body portion and disposed between said valve member and said valve body to provide, in combination with said hollow body portion, a thrust bearing means for said shaft and said valving member, and also having sufficient dimensional thickness and configuration with respect to said hollow body portion to provide a reliable locating means for positioning and aligning said valving member;
    at least a portion of the perimeter of said shoulder flange being linear and engaging a corresponding linear surface of said valve body so as to prevent rotation of said unitary sleeve and thrust bearing and locator means with respect to said valve body; and
    said shoulder flange portion including a lower surface having a radiused configuration and said valve body including a corresponding surface adjacent said shaft bore such that said shoulder flange lower surface matingly engages said valve body surface to further restrict rotation of said unitary sleeve and thrust bearing and locating means and such that said shoulder flange lower surface reduced the effect of destructive stresses applied to said shoulder flange portion as the thrust bearing means.

2. The valve means according to claim 1 wherein the radiused configuration of said shoulder flange portion is formed so as to provide a thickened cross sectional dimension of said shoulder flange portion adjacent said hollow body portion.

3. In a valve means, suitable for use with high temperature fluids or fluids having corrosive characteristics, including a valve body having a fluid passageway therethrough, at least one shaft bore extending into said valve body, a valving member disposed within said fluid passageway and rotatably mounted on a shaft supported within said shaft bore, sleeve bearing means between said shaft and said shaft bore, thrust bearing means for supporting said shaft and said valving member, and locating means for positioning and aligning said valving member within said fluid passageway, the improvement being a unitary sleeve and thrust bearing and locating means comprising:
    a hollow body portion inserted within said shaft bore and having said shaft inserted therethrough so as to provide a sleeve bearing means for said shaft upon rotation of said shaft;
    a shoulder flange portion integrally formed with said hollow body portion and disposed between said valve member and said valve body to provide, in combination with said hollow body portion, a thrust bearing means for said shaft and said valving member, and also having sufficient dimensional thickness and configuration with respect to said hollow body portion to provide a reliable locating means for positioning and aligning said valving member;
    said shoulder flange portion including a lower surface having a radiussed configuration and said valve body includes a correspondingly radiussed surface adjacent said shaft bores such that said shoulder flange lower surface matingly engages said radiussed valve body surface to restrict rotation of said unitary sleeve and thrust bearing and locator means with respect to said valve body; and
    said unitary sleeve and thrust bearing and locating means being formed from a single, homogenous material.

4. The valve means according to claim 3 wherein the perimeter of said shoulder flange portion is keyed to matingly engage said valve body in a specific orientation.

5. The valve means according to claim 4 wherein said perimeter of said shoulder flange portion comprises a plurality of straight segments.

6. The valve means according to claim 3 wherein the center of said shoulder flange is radially offset with respect to the longitudinal axis of said hollow body portion so as to key said unitary sleeve and thrust bearing and locator means with respect to said valve body.

* * * * *

UNITED STATES PATENT AND TRADEMARK OFFICE
CERTIFICATE OF CORRECTION

PATENT NO. : 4,589,628

DATED : May 20, 1986

INVENTOR(S) : Barker et al.

It is certified that error appears in the above-identified patent and that said Letters Patent is hereby corrected as shown below:

Column 3, line 3, delete "minumum" and insert therefor --minimum--.

Column 6, line 51, delete "surace" and insert therefor --surface--.

Column 7, line 45, delete "menas" and insert therefor --means--.

Column 7, line 56, delete "engageble" and insert therefor --engageable--.

Column 7, line 59, delete "engagable" and insert therefor --engageable--.

Column 8, line 35, delete "engagable" and insert therefor --engageable--.

Column 9, line 35, after "said" and before "inserted" insert --shaft--.

Column 9, line 55, delete "radiused" and insert therefor --radiussed--.

Column 10, line 1, delete "reduced" and insert therefor --reduces--.

Signed and Sealed this

Second Day of September 1986

[SEAL]

Attest:

DONALD J. QUIGG

*Attesting Officer*     *Commissioner of Patents and Trademarks*